United States Patent [19]

Sinclair

[11] Patent Number: 5,309,763
[45] Date of Patent: May 10, 1994

[54] LIQUID-LEVEL GAUGING
[75] Inventor: David Sinclair, Chineham, England
[73] Assignee: Smiths Industries Public Limited Company, London, England
[21] Appl. No.: 26,767
[22] Filed: Mar. 5, 1993
[30] Foreign Application Priority Data
  Mar. 21, 1992 [GB] United Kingdom ............... 9206202
[51] Int. Cl.⁵ ............................................. G01F 23/28
[52] U.S. Cl. ............................... 73/290 V; 367/908; 367/99; 181/124
[58] Field of Search ............... 73/290 V; 367/908, 99; 181/123, 124, 402, 400
[56] References Cited

U.S. PATENT DOCUMENTS

| 3,214,974 | 11/1965 | Altman et al. | 73/290 V |
| 3,290,944 | 12/1966 | Altman et al. | 73/290 V |
| 3,693,445 | 9/1972 | Johnson | 73/290 V |
| 4,531,406 | 7/1985 | Fritz | 73/290 V |
| 5,095,748 | 3/1992 | Gregory et al. | 73/290 V |
| 5,121,340 | 6/1992 | Campbell et al. | 73/290 V |
| 5,127,266 | 7/1992 | Maresca et al. | 73/290 V |

FOREIGN PATENT DOCUMENTS

| 0138541 | 4/1985 | European Pat. Off. . | |
| 3330059 | 2/1985 | Fed. Rep. of Germany | 73/290 V |
| 0069024 | 5/1980 | Japan | 73/290 V |
| 2247753 | 3/1992 | United Kingdom . | |
| 9119191 | 12/1991 | World Int. Prop. O. . | |
| 9214996 | 9/1992 | World Int. Prop. O. . | |

Primary Examiner—Diego F. F. Gutierrez
Attorney, Agent, or Firm—Pollock, VandeSande and Priddy

[57] ABSTRACT

An ultrasonic liquid-level sensing system has a sensor with a number of reflectors mounted one above the other along the length of a tube that extends upwardly from a transducer and is filled with liquid to the same height as outside the tube. Liquid height is calculated from the difference between the arrival times of the pulses reflected from the two uppermost submerged reflectors and the difference between the arrival times of pulses reflected from the surface of the liquid and the uppermost submerged reflector.

11 Claims, 2 Drawing Sheets

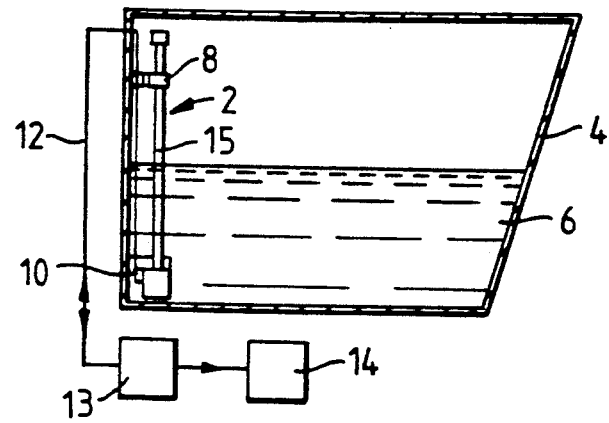
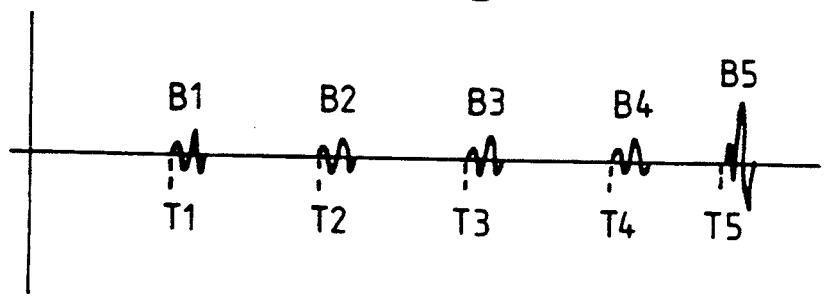

LIQUID-LEVEL GAUGING

CROSS REFERENCE TO OTHER APPLICATION

The invention of this application is related to the subject matter described in applicant's copending U.S. application Ser. No. 08/021,465, filed Feb. 23, 1993, for "Liquid-Level Gauging", corresponding to U.K. application 9205148 filed Mar. 10, 1992.

BACKGROUND OF THE INVENTION

This invention relates to liquid-level gauging.

The invention is more particularly concerned with ultrasonic liquid-level gauging sensors and systems.

Ultrasonic liquid-level sensors utilize the fact that ultrasonic vibrations travel freely in a liquid but are rapidly attenuated in air or other gas. If an ultrasonic transducer is mounted on the base of a liquid reservoir so that it directs energy up towards the liquid/air interface, the energy will be reflected back down to the transducer by this interface. By measuring the time taken between transmission and reception of an energy pulse, it is possible to measure the distance between the transducer and the liquid/air interface and, from this, the depth of liquid.

It is common practice for ultrasonic transducers of this kind to be mounted at the lower end of a tube that extends from the bottom to the top of the liquid reservoir. The tube is open at the bottom so that liquid fills the tube to the same depth as in the reservoir outside the tube. The tube serves several purposes. It helps isolate the transducer from other sensors or sources of interference. It also confines the ultrasonic beam, so that it is directed only at the region of the liquid surface directly above the transducer. Furthermore, the tube produces within it a region of liquid surface that is substantially damped of waves.

Another advantage arising out of the use of the tube is that it is easy to provide a reference height, by mounting some form of reflector at a known height within the tube. In this way, the transducer will receive a reflection from the liquid surface and one from the reference reflector against which the liquid height can be calibrated. This enables the ultrasonic gauging system to compensate for different liquids having different acoustic propagation properties and for temperature variations which can affect ultra-sound propagation. An example of an ultrasonic probe having a tube of this kind is described in, for example, EP 0106677. In this previous arrangement, the reflected pulse from the reflector below the liquid level is used to provide an average indication of the velocity of sound in the fluid below that reflector. This indication of the average velocity is used, in conjunction with the time of travel of pulses reflected from the liquid surface, to calculate the fluid height. Although this does take into account variation in acoustic propagation of fluids, it does not produce accurate results where there is considerable stratification of the fluid. In aircraft applications, for example, the fuel remaining in a tank after a flight may be at a very low temperature. On refuelling, with warmer fuel, this will lie above the cold fuel and will have very different acoustic propagation properties. Taking the average of the acoustic velocity within the fuel below the uppermost submerged reflector will not, therefore, necessarily give a very accurate indication of the acoustic propagation properties for the fuel above the reflector.

BRIEF SUMMARY OF THE INVENTION

It is an object of the present invention to provide an improved ultrasonic liquid-level gauging system.

According to one aspect of the present invention there is provided a liquid-level gauging system including an ultrasonic liquid-level sensor and processing means, the sensor including an ultrasonic transducer mounted towards the lower end of the sensor and arranged to direct ultrasonic energy generally upwards through the liquid, a plurality of reflectors mounted one above the other along the height of the sensor such that each reflector submerged in liquid reflects ultrasound energy back to the transducer, and the processing means being arranged to identify reflections from the uppermost two of the submerged reflectors and to measure the height of the liquid above the uppermost of the submerged reflectors from the times of arrival of pulses reflected from the liquid surface and the two uppermost submerged reflectors.

The processing means may be arranged to calculate the height of the liquid from the ratio of the difference between the arrival times of pulses reflected from the two uppermost submerged reflectors and the difference between the arrival times of pulses reflected from the liquid surface and one or the other of the two uppermost submerged reflectors. The sensor may include a tube extending upwardly above the transducer that is arranged to be filled with liquid to the same height as liquid outside the tube, the reflectors being studs that project through the wall of the tube. The system may include means to energize the transducer to produce bursts of ultrasonic energy having durations that are longer when liquid level is high than when liquid level is low. The system may include means to energize the transducer to produce ultrasonic energy having an amplitude that is greater when liquid level is high than when liquid level is low. The processing means may have a higher gain when liquid level is high than when liquid level is low.

According to another aspect of the present invention there is provided a method of liquid-level gauging including the steps of energizing an ultrasound transducer submerged in liquid to produce bursts of ultrasound energy upwardly towards the liquid surface and to a series of reflectors mounted one above the other beneath the liquid, receiving ultrasound energy reflected from the liquid surface and the submerged reflectors, identifying reflections from the uppermost two of the submerged reflectors and the liquid surface, and calculating the height of liquid from the times of arrival of pulses reflected from the liquid surface and the two uppermost submerged reflectors.

The calculating step preferably includes measuring the difference between the arrival times of the pulses reflected from the two uppermost submerged reflectors and the difference between the arrival times of pulses reflected from the liquid surface and one or the other of the two uppermost submerged reflectors.

Such a system and method can provide an accurate liquid level measurement in situations where there is severe stratification of the liquid at the bottom of the tank because the height is measure above the uppermost submerged reflector and is based on the propagation properties of liquid in the zone immediately below this reflector which in most cases are very similar to those in the zone immediately above the reflector.

A fuel-gauging system for an aircraft including an ultrasonic sensor, in accordance with the present invention, will now be described, by way of example, with reference to the accompanying drawings.

BRIEF DESCRIPTION OF THE DRAWINGS

FIG. 1 is a side elevation view of the system;

FIG. 3 illustrates signals received in the system.

DETAILED DESCRIPTION OF THE PREFERRED EMBODIMENT

Figure 2:
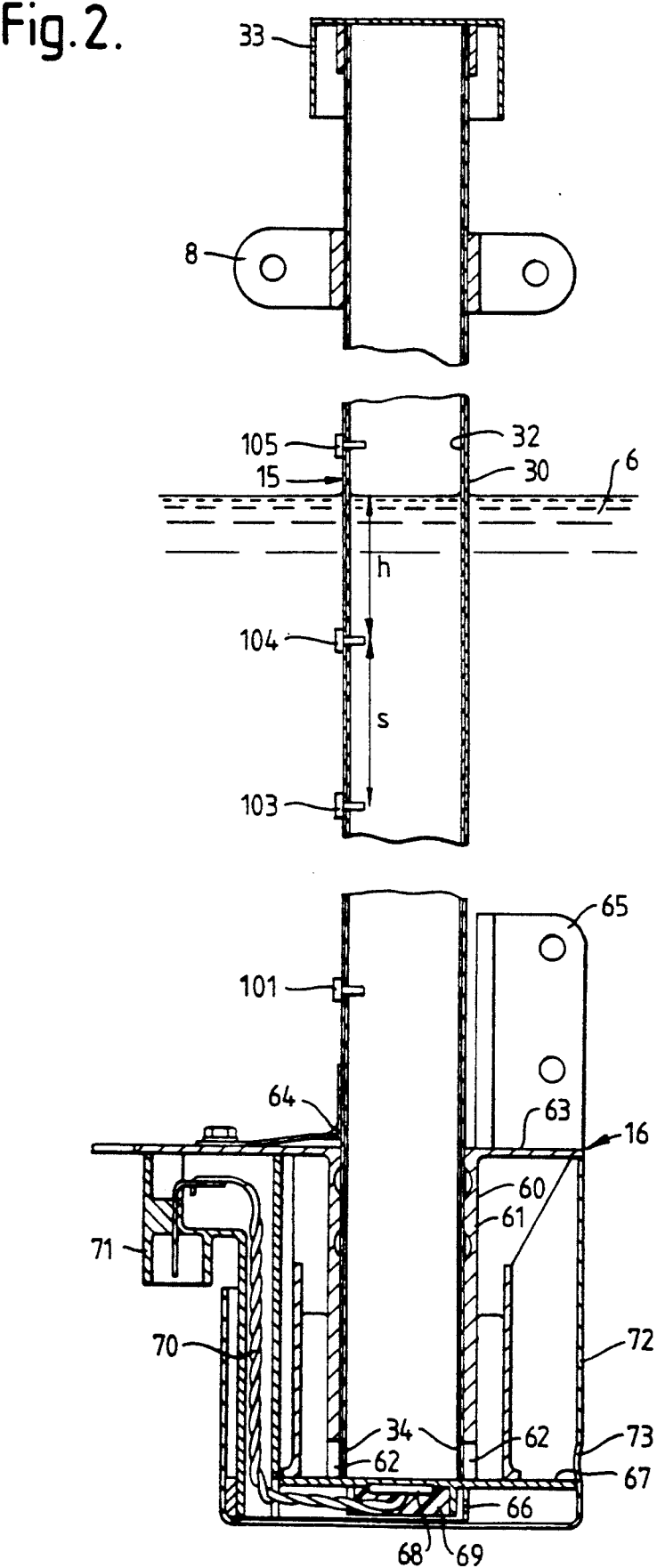
FIG. 2 is an enlarged sectional side elevation view of the sensor.

With reference to FIG. 1, the sensor 2 is mounted vertically in a tank 4 of an aircraft containing liquid fuel 6. The sensor 2 is supported by two clamps 8 and 10 which are secured to the upper and lower end of the sensor respectively and to the wall of the tank 4. The drive signal to the sensor and its electrical output are taken from the lower end of the sensor via a cable 12 to a control unit 13 including a fuel gauging computer which computes the volume of fuel from the height information provided by the sensor and from knowledge of the tank shape. The output from the control unit 13 is supplied to a display 14, or other utilization means, which may be in terms of either volume or mass if a density input is provided.

With reference now also to FIG. 2, the sensor 2 comprises a tubular assembly 15 and a base assembly 16 mounted at the lower end of the tubular assembly.

The tubular assembly 15 is up to about 2 meters long and has an external diameter of about 25 mm. The assembly is made up from a cylindrical tube 30 of metal, such as aluminum, which has a wall thickness of about 0.5 mm and a coated layer 32 on its inside of an acoustically-absorbing plastics material such as a two-part polysulphide or similar plastics material. The thickness of the layer 32 is not critical and is typically about equal to the wall thickness of the tube 30, being between about 0.4 to 0.5 mm. The layer of acoustically-absorbing material could instead be applied to the outside of the tube although the improvement this produces is not as great as for an internal layer. The coating can be carried out by any conventional technique such as by pouring the coating material in a liquid form through the tube. At its upper end, the assembly 15 is closed by a metal cap 33 soldered to the tube 30. At its lower end, the assembly is open to fuel within the tank 4 through four equally-spaced slots 34 around the lower end of the tube 30. Ten reference reflectors 101 to 110 (only five of which are shown) are mounted one above the other in the tubular assembly 15. The reflectors 101 to 110 are short rectangular stubs of metal or other acoustically-reflecting material and project horizontally across about one third of the diameter and are equally spaced from one another along the probe.

The base assembly 16 includes an inner support structure 60 with a tubular sleeve 61 that embraces the lower end of the tube 30, the sleeve having slots 62 that align with the slots 34 in the tube. At its upper end, the support structure 60 has a radially-extending flange 63. On one side, this is secured with the tube 30 by means of a metal strap 64 which is brazed to the outside of the tube at one end and is bolted to the flange 63 at its other end. A mounting bracket 65 projects vertically from the flange 63, this being attached to the clamp 10 at the lower end of the sensor. At the lower end of the base assembly 16 there is a transducer assembly 66 which comprises a mounting plate 67 and an ultrasonic transducer 68 potted onto the underside of the plate with an acoustically-absorbing plastics 69 such as polysulphide. The transducer 68 is positioned on the axis of the tube 30 and its wires 70 extend into a terminal block 71, the hollow space around the wires being potted with a plastics material that is slightly conductive electrically, such as a polysulphide with a dispersed conductive powder. This provides a safety leakage path with a resistance of the order of several thousand ohms to prevent charge built-up in the event of damage to the sensor 2. The mounting plate 67 is of a plastics material such as polyphenylene sulphide and its thickness is such that it enables the axial beam of energy from and to the transducer to pass through the plate without substantial attenuation. The plastics material of the plate 67, however, with the potting material 69, acts as an acoustic isolator, isolating the transducer from the tubular assembly 15.

The base assembly 16 is completed by a cylindrical outer cover 72 which encloses the structure 60 and the transducer assembly 66. Apertures 73 towards the lower end of the cover 72 allow fuel to flow into and out of the base assembly 16, and hence, into and out of the tubular assembly 15.

In use, the processing unit 13 energizes the transducer 68 with electrical pulses that cause the transducer to emit ultrasonic energy bursts of generally sinusoidal form with a frequency of about 1 MHz and a burst repetition frequency of about 1 second. The number of electrical pulses supplied to the transducer 68 varies according to the height of fuel in the tank 4. A greater number of pulses are supplied to the transducer 68 when there is a large amount of fuel in the tank than when the fuel height is at a low level so that the duration of ultrasonic energy transmitted by the transducer reduces with a fall in the height of fuel. Because the ability of the processing unit 13 to distinguish reflected pulses from noise depends to a large extent on the length of the bursts of energy received by the transducer, the longer bursts maximize this ability at greater depths where the amplitude of the received signals will be reduced. At lower depths, where the signals received by the transducer 68 will occur very shortly after transmission, there would be a risk of the beginning of the reflected burst overlapping the end of the transmitted burst, making it difficult or impossible to identify the start of the reflected burst accurately. By shortening the bursts at low heights, the separation between the end of the transmitted burst and the start of the reflected burst is maximized and hence the ability of the system accurately to identify low level pulses is improved. The amplitude of the transmitted energy may also be varied according to liquid level so that the strength of the transmitted energy is increased for high levels of fuel and reduced for low levels of fuel. Similarly, the gain of the receiving amplifier in the processing unit 13 may be varied with liquid height so that a higher gain is used for the weaker received signals reflected from higher level fuel surfaces.

The ultrasonic energy is directed vertically upwards, along the axis of the tubular asssembly 15. Each burst of ultrasonic energy travels axially up the assembly 15 within the fuel 6 until it meets the interface with the air or gas in the tank 4 above the fuel. At this point the energy burst is reflected downwardly back to the transducer 68. The transducer 68 will also receive an echo signal arising from reflection from those of the reflectors 101 to 110 which are submerged. These echo signals provide calibration signals, against which the echo from the liquid surface can be calibrated, as described below. The coating 32 on the inside of the assembly 15 reduces considerably the amount of energy transferred from the fuel within the assembly to the wall of the assembly and the amount of energy transferred from the wall to the fuel. This leads to a considerably cleaner output signal, that is one with far less spurious noise, than would be produced by a metal tubular assembly that did not have a similar coating.

When the fuel surface lies between the fourth reflector 104 and the fifth reflector 105, the signals received by the transducer 68 will resemble those shown in FIG. 3. The signals comprise four relatively low amplitude bursts B1 to B4, produced by reflection from the reflectors 101 to 104, and one higher amplitude signal produced by the reflection from the fuel surface. The times of reception of the bursts B1 to B5 are designated T1 to T5 respectively. Because the location of the reflectors 101 to 104 is known, each of the bursts B1 to B4 is associated with a reflection from a known height. The processing unit 13 computes the height h of the fuel above the highest of the submerged reflectors 104 from the signals received at the transducer 68 from the two highest submerged reflectors 103 and 104. These reflected signals are readily identified because they are the penultimate signal and the third from last signal in any series of received signals. Once the signals from the two highest reflectors have been identified, signals from the other reflectors can be ignored. More particularly, the processing unit 13 calculates the ratio of the time difference between reception of the signals from the fuel surface and the uppermost submerged reflector 104, and the time difference between signals from the uppermost reflector and the reflector 103 immediately below it, or:

$$(T5-T4)/(T4-T3)=h/s \quad (1)$$

where s is the spacing between the reflectors 103 and 104 Rearranging (1) gives:

$$h=s.(T5-T4)/(T4-T3) \quad (2)$$

The total height of fuel is then calculated by adding h to the known height of the uppermost submerged reflector 104.

Alternatively, the time difference between reception of the fuel surface echo and that from the lower of the two uppermost of the submerged reflectors 103 could be measured to give an expression:

$$(T5-T3)/(T4-T3)=(h+s)/s \quad (3)$$

This can be simplified to give:

$$h=s.(T5-T3)/(T4-T3)-s \quad (4)$$

It can be seen that this technique computes the height of fuel above the uppermost reflector using information about the acoustic propagation properties within the zone of fuel immediately below this reflector. Where there is considerable stratification of the fuel, this will provide a more accurate measure of fuel height than previous techniques which average the propagation properties of the fuel over its entire height.

When the fuel surface lies below the reflector 102 which is the second from the bottom, it will not be possible to use this technique but in these situations stratification will not be a significant problem.

Although the tube gives the sensor advantages, the invention could be used in sensors where the reflectors are mounted on a support rod or on the wall of the tank.

What I claim is:

1. A liquid-level gauging system comprising: an ultrasonic liquid-level sensor, the sensor including an ultrasonic transducer mounted towards a lower end of the sensor and arranged to direct ultrasonic energy generally upwards through a liquid, at least three reflectors, and means mounting the at least three reflectors at known fixed positions and spacings one above the other along the entire height of the sensor such that each reflector submerged in liquid reflects ultrasound energy back to the transducer; and processing means operative to identify reflections from the uppermost two of the submerged reflectors, operative to derive information about the time of arrival of pulses, and operative to determine the height of the liquid above the uppermost one of the submerged reflectors from the times of arrival of pulses reflected from the liquid surface and the two uppermost submerged reflectors, 2. A system according to claim 1 wherein the processing means calculates the height of the liquid from the known spacings of the reflectors, the difference between the arrival times of the pulses reflected from the two uppermost submerged reflectors and the difference between the arrival times of pulses reflected from the liquid surface and one of the two uppermost submerged reflectors.

3. A system according to claim 1 or 2, wherein the sensor includes a tube, and means mounting the tube to extend upwardly above the transducer, the tube being open at its lower end so that it is filled with liquid to the same height as liquid outside the tube, said reflectors being studs that project through a wall of the tube.

4. A system according to claim 1 including means to energize the transducer to produce bursts of ultrasonic energy having durations that are longer when the determined height of the liquid is high than when the determined liquid height is low.

5. A system according to claim 1 including means to energize the transducer to produce ultrasonic energy having an amplitude that is greater when the determined height of the liquid is high than when the determined height of the liquid is low.

6. A system according to claim 1 wherein the processing means has a higher gain when the determined height of the liquid is high than when the determined height of the liquid is low.

7. A method of liquid-level gauging including the steps of: energizing an ultrasound transducer submerged in liquid to produce bursts of ultrasound energy directed upwardly towards the liquid surface and toward a series of at least three reflectors mounted at known fixed positions and spacings one above the other along the entire length of an elongated sensor; receiving ultrasound energy reflected from the liquid surface and submerged ones of said reflectors; identifying reflections from the uppermost two of the submerged reflectors and the liquid surface, and calculating the height of liquid from the spacing of the reflectors and the times of arrival of pulses reflected from the liquid surface and the two uppermost submerged reflectors.

8. A method according to claim 7 wherein the calculating step includes measuring the difference between the arrival times of the pulses reflected from the two uppermost submerged reflectors and the difference between the arrival times of pulses reflected from the liquid surface and one of the two uppermost submerged reflectors, and multiplying a ratio of said differences by the spacing between said two reflectors.

9. A method according to claim 7 or 8 wherein the transducer is energized to produce bursts of ultrasonic energy having durations that are changed with changes in the calculated height of the liquid.

10. A method according to claim 7 wherein the transducer is energized to produce ultrasonic energy having an amplitude that is changed with changes in the calculated height of the liquid.

11. A method according to claim 7 wherein the ultrasonic energy received by reflection is amplified with a higher gain when the calculated height of the liquid is high than when the calculated height of the liquid is low.

* * * * *